United States Patent
Smadi et al.

(10) Patent No.: US 9,307,414 B2
(45) Date of Patent: Apr. 5, 2016

(54) CO-EXISTENCE AWARE RATE SUPPORT

(75) Inventors: Mohammed Nawaf Smadi, Ancaster (CA); Jianfeng Weng, Kanata (CA)

(73) Assignee: BLACKBERRY LIMITED, Waterloo (CA)

( * ) Notice: Subject to any disclaimer, the term of this patent is extended or adjusted under 35 U.S.C. 154(b) by 764 days.

(21) Appl. No.: 13/462,863

(22) Filed: May 3, 2012

(65) Prior Publication Data

US 2013/0295989 A1 Nov. 7, 2013

(51) Int. Cl.
*H04W 88/06* (2009.01)
*H04W 16/14* (2009.01)
*H04W 72/12* (2009.01)

(52) U.S. Cl.
CPC .......... *H04W 16/14* (2013.01); *H04W 72/1215* (2013.01); *H04W 88/06* (2013.01)

(58) Field of Classification Search
CPC .............................. H04W 16/14; H04W 88/06
See application file for complete search history.

(56) References Cited

U.S. PATENT DOCUMENTS

| | | | |
|---|---|---|---|
| 7,031,266 B1* | 4/2006 | Patel et al. | 370/254 |
| 2002/0193133 A1* | 12/2002 | Shibutani | 455/522 |
| 2003/0095506 A1* | 5/2003 | Jalali et al. | 370/252 |
| 2009/0040937 A1 | 2/2009 | Xhafa et al. | |
| 2009/0163145 A1 | 6/2009 | Xhafa et al. | |
| 2010/0034913 A1 | 2/2010 | Grunitz et al. | |
| 2010/0040033 A1 | 2/2010 | Xhafa et al. | |
| 2010/0085946 A1 | 4/2010 | Sun et al. | |
| 2010/0238807 A1 | 9/2010 | Xhafa et al. | |
| 2010/0268841 A1 | 10/2010 | Xhafa et al. | |
| 2011/0086660 A1 | 4/2011 | Sun et al. | |
| 2011/0222409 A1 | 9/2011 | Sun et al. | |
| 2011/0235600 A1 | 9/2011 | Sun et al. | |
| 2011/0294502 A1 | 12/2011 | Oerton | |
| 2012/0034913 A1 | 2/2012 | Wang et al. | |
| 2012/0039329 A1 | 2/2012 | Sun et al. | |
| 2012/0040620 A1 | 2/2012 | Fu et al. | |
| 2012/0044915 A1 | 2/2012 | Oerton | |
| 2012/0087341 A1 | 4/2012 | Jang et al. | |
| 2012/0134390 A1 | 5/2012 | Smadi et al. | |
| 2012/0147274 A1* | 6/2012 | Hassan et al. | 348/729 |
| 2012/0147828 A1* | 6/2012 | Wigren | 370/329 |

(Continued)

FOREIGN PATENT DOCUMENTS

WO 2012044327 4/2012

OTHER PUBLICATIONS

Rothlubbers, C , Extended European Search Report for EP 12166522.8, Nov. 7, 2012.
3GPP TR 36.816 V11.2.0 : 3rd Generation Partnership Project; Technical Specification Group Radio Access Network; Evolved Universal Terrestrial Radio Access (E-UTRA); Study on signalling and procedure for interference avoidance for in-device coexistence, Dec. 2011.

*Primary Examiner* — Mazda Sabouri

(74) *Attorney, Agent, or Firm* — Integral Intellectual Property Inc.; Miriam Paton

(57) ABSTRACT

An apparatus has a first communication module and a second communication module. The first communication module is compatible with a first wireless communication technology, and the second communication module is compatible with a second wireless communication technology that differs from the first wireless communication technology. Transmissions by the second communication module may contribute to interference at the first communication module. The first communication module refrains from advertising support for any data rate that is not expected to be sufficiently resilient in the face of interference caused by transmissions from the second communication module.

15 Claims, 7 Drawing Sheets

(56) References Cited

U.S. PATENT DOCUMENTS

| | | |
|---|---|---|
| 2012/0213116 A1 | 8/2012 | Koo et al. |
| 2013/0182584 A1* | 7/2013 | Maguluri et al. ............. 370/252 |
| 2013/0182650 A1 | 7/2013 | Vytautas Robertas Kezys et al. |

\* cited by examiner

CO-EXISTENCE AWARE RATE SUPPORT

TECHNICAL FIELD

The technology described herein relates generally to co-existence of wireless communication technologies.

BACKGROUND

An apparatus having both a wireless local area network (WLAN) communication module and a Long Term Evolution (LTE) communication module may operate as a mobile hotspot. The apparatus, associated with client devices in a WLAN, provides the client devices with access to the Internet over the cellular network, using the LTE communication module's connection to the cellular network for wireless backhaul.

Some frequency bands of LTE overlap or are adjacent or near to WLAN frequency bands. Thus transmissions from the LTE communication module may contribute to the interference at the WLAN communication module.

BRIEF DESCRIPTION OF THE DRAWINGS

FIG. 2-1 illustrates the proximity of certain frequency bands of IEEE 802.16 to the ISM 2.4 GHz band;

FIG. 2-2 illustrates the proximity of certain frequency bands of Long Term Evolution (LTE) to the ISM 2.4 GHz band;

DETAILED DESCRIPTION

Figure 1:
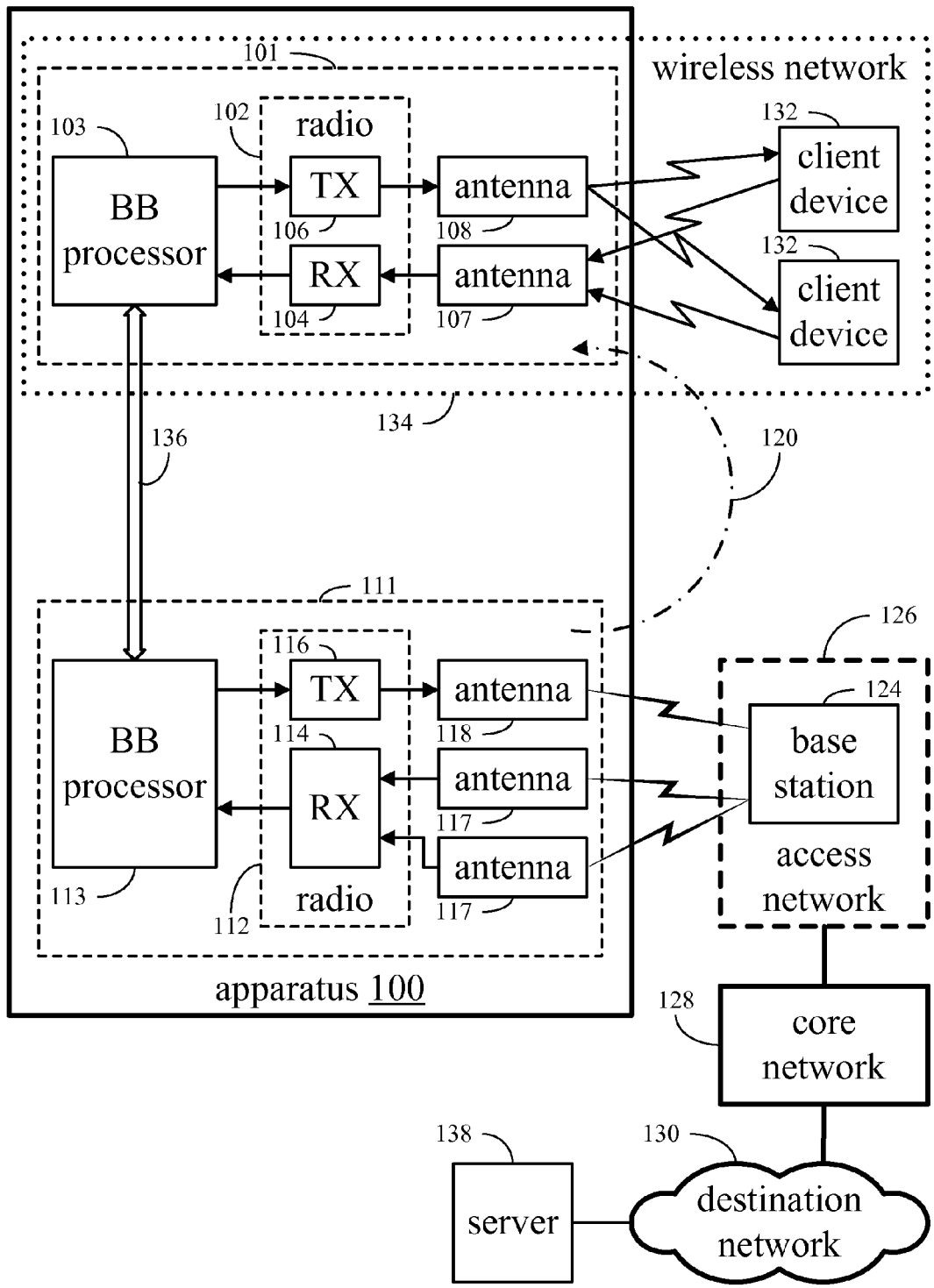
FIG. 1 is an illustration of an example network architecture.

An apparatus has a first communication module that is compatible with a first wireless communication technology and a second communication module that is compatible with a second wireless communication technology that differs from the first wireless communication technology. A first radio in the first communication module is operable in one or more channels of a first radio frequency band, and a second radio in the second communication module is operable in a second radio frequency band that overlaps or is adjacent or is near the first radio frequency band, such that transmissions by the second communication module may contribute to the interference at the first communication module.

The first communication module is operable to communicate with one or more client devices that are compatible with the first wireless communication technology. When operating as a wireless access point (AP), the first communication module therefore supports a wireless network which one or more client devices may join. In its operation as an AP, the first communication module is operable to advertise support for one or more supported data rates, the one or more supported data rates belonging to a set of data rates permitted in the first wireless communication technology. For example, the advertisement may be made in beacon frames broadcasted on a regular basis by the first communication module, or in a frame transmitted by the first communication module in response to a query or request from a client device.

This paper proposes that the first communication module refrains from advertising support for any data rate that is not expected to be sufficiently resilient in the face of interference caused by transmissions from the second communication module.

In one version, the first communication module advertises support for a single supported data rate, and does not advertise support for any other data rate. The single supported data rate may be the lowest data rate permitted in the first wireless communication technology. Alternatively, the single supported data rate may be the lowest data rate to be used with orthogonal frequency-division multiplexing (OFDM) permitted in the first wireless communication technology.

In another version, the first communication module does not advertise support for any data rate that exceeds an apparatus-specific channel-specific fixed rate threshold, and advertises support for one or more supported data rates each of which does not exceed the fixed rate threshold. The fixed rate threshold for a specific apparatus is defined as the rate at which data would be receivable on a specific channel at a predetermined quality by the first communication module if the first communication module were to receive the data in a signal to which a predicted signal-to-interference-plus-noise ratio (SINR) is applicable, the specific SINR taking into account a contribution of transmissions by the second communication module to a predicted interference at the first communication module. The fixed rate threshold is fixed in the sense that i) the predicted SINR is calculated or estimated only once per channel for a specific apparatus, ii) the fixed rate threshold corresponding to the predicted SINR is determined only once per channel for a specific apparatus, and iii) the set of one or more supported data rates for which the specific apparatus advertises support does not change over time as long as the first communication module operates on a particular channel. The fixed rate threshold (and hence the set of one or more supported data rates for which support is advertised) may be different for different apparatuses.

In yet another version, the first communication module does not advertise support for any data rate that exceeds a dynamic rate threshold, and advertises support for one or more supported data rates each of which does not exceed the dynamic rate threshold. The dynamic rate threshold for a specific apparatus is defined as the rate at which data would be receivable at a predetermined quality by the first communication module if the first communication module were to receive the data in a signal to which a specific SINR is applicable, the specific SINR taking into account a contribution of transmissions by the second communication module to interference at the first communication module. The specific SINR is estimated or predicted. The dynamic rate threshold is changeable in the sense that the specific SINR (and hence the corresponding dynamic rate threshold) is recalculated at different times for a particular apparatus, and the set of one or more supported data rates for which the particular apparatus advertises support may change over time. The dynamic rate threshold (and hence the set of one or more supported data rates for which support is advertised) may be different for different apparatuses.

In the case that the change in the dynamic rate threshold increases or decreases the number of data rates that do not exceed the dynamic rate threshold, the advertisement prior to the change may differ from the advertisement after the change. Client devices that are newly arriving in the coverage area of the wireless network will communicate with the first communication module only at data rates that, per the advertisement after the change, are supported. Client devices that previously joined the wireless network may be required, after an update period of time, to restrict their communications in the wireless network to the data rates that, per the advertisement after the change, are supported.

In the case that the change in the dynamic rate threshold increases or decreases the number of data rates that do not exceed the dynamic rate threshold, the first communication module may trigger a disassociation between the first communication module and any client devices that are associated to the first communication module, responsive to which the client device will attempt an association or reassociation, thus receiving the advertisement after the change.

The second communication module may notify the first communication module in advance of certain scheduled predictable transmissions by the second communication module. Responsive to this notification, the first communication module may perform any or any combination of the following acts in advance of a scheduled transmission: calculate or estimate the SINR expected to be calculated by the first communication module during the scheduled transmission, change the advertisement of support for data rates, and trigger disassociation of associated client devices. If the first communication module can predict or is notified by the second communication module of the expected duration of a scheduled transmission, the first communication module may perform any or any combination of the following acts in advance of the end of the scheduled transmission: calculate or estimate the SINR expected to be calculated once the scheduled transmission has ended, change the advertisement of support for data rates, and trigger disassociation of associated client devices.

FIG. 1 is an illustration of an example network architecture.

An apparatus 100 has a first communication module, generally referenced 101, that is compatible with a first wireless communication technology. The first communication module 101 includes a first radio 102 coupled to a first baseband (BB) processor 103, and one or more first antennae coupled to the first radio 102. The first radio 102 includes a receiver (RX) 104 and a transmitter (TX) 106. At least one of the first antennae is used as a receiver antenna 107 by receiver 104. At least one of the first antennae is used as a transmitter antenna 108 by transmitter 106. Although not illustrated as such, it is possible for receiver antenna 107 and transmitter antenna 108 to be a single antenna. Although not illustrated as such, it is possible for the one or more first antennae to be external to the apparatus 100. Transmitter 106 is operable to put channel bits output by BB processor 103 into a form that permits their communication upon radio frequency (RF) channels and causes the communication of the channel bits upon the RF channels via transmitter antenna 108. For example, transmitter 106 may comprise upconverters, modulators, a power amplifier, and other components. Receiver 104 is operable to receive radio frequency signals via receiver antenna 107, to amplify and to demodulate the received signals, to down-convert the demodulated signals to baseband frequencies, and to perform other operations, for example, soft decision operations or hard decision operations, in order to derive received bits for processing by BB processor 103.

The apparatus 100 has a second communication module, generally referenced 111, that is compatible with a second wireless communication technology that differs from the first wireless communication technology. The second communication module 111 includes a second radio 112 coupled to a second baseband processor 113, and one or more second antennae coupled to the second radio 112. The second radio 112 includes a receiver 114 and a transmitter 116. At least one of the second antennae is used as a receiver antenna 117 by receiver 114. At least one of the second antennae is used as a transmitter antenna 118 by transmitter 116. Although not illustrated as such, it is possible for receiver antenna 117 and transmitter antenna 118 to be a single antenna. Although not illustrated as such, it is possible for the one or more second antennae to be external to the apparatus 100. Transmitter 116 is operable to put channel bits output by BB processor 113 into a form that permits their communication upon RF channels and causes the communication of channel bits upon the RF channels via transmitter antenna 118. Receiver 114 is operable to receive radio frequency signals via receiver antenna 117, to amplify and to demodulate the received signals, to down-convert the demodulated signals to baseband frequencies, and to perform other operations, for example, soft decision operations or hard decision operations, in order to derive received bits for processing by BB processor 113.

The first radio 102 is operable in one or more channels of a first radio frequency band, and the second radio 112 is operable in a second radio frequency band that overlaps or is adjacent or is near the first radio frequency band, such that transmissions by the second communication module 111 contribute (illustrated by curve 120) to the interference at the first communication module.

Antenna isolation between the receiver antenna 107 and the transmitter antenna 118 is a measurable quantity related to the attenuation of signals that are produced by the transmitter 116 and that are transmitted via the transmitter antenna 118 on their way to be received at the receiver antenna 107 by the receiver 104. Many factors in the design and manufacture of apparatus 100, for example physical separation between the receiver antenna 107 and the transmitter antenna 118, may affect the actual antenna isolation value. Size constraints for apparatus 100 limit the physical separation between the receiver antenna 107 and the transmitter antenna 118.

An optional co-existence filter (not shown) incorporated into the receiver 104 may further attenuate the signals produced by the transmitter 116 and transmitted via the transmitter antenna 118 on their way to be received at the receiver antenna 107 by the receiver 104.

In one case, the first wireless communication technology may be based on any one or any combination of the IEEE 802.11 family of wireless local area network (WLAN) standards (as described in IEEE Std. 802.11™-2012 published 29 Mar. 2012 by IEEE Computer Society) or future related standards, and the second wireless communication technology may be based on $3^{rd}$ Generation Partnership Project (3GPP) Long Term Evolution (LTE) or LTE-Advanced, or future related standards. 3GPP LTE is also known as Evolved Universal Terrestrial Radio Access (E-UTRA) (Release 8). In this case, the apparatus 100 is referred to as LTE user equipment (UE) or E-UTRA UE.

In another case, the first wireless communication technology may be based on any one or any combination of the IEEE 802.11 family of WLAN standards (as described in IEEE Std. 802.11™-2012 published 29 Mar. 2012 by IEEE Computer Society) or future related standards, and the second wireless communication technology may be based on any one or any combination of the IEEE 802.16 family of standards or future standards. The term "WiMAX®" refers to interoperable implementations of the IEEE 802.16 family of WMAN standards ratified by the WiMAX Forum.

For example, the first wireless communication technology may be based on IEEE 802.11g, as published in Clause 19 of IEEE Std. 802.11™-2012, or based on IEEE 802.11n, as published in Clause 20 of IEEE Std. 802.11™-2012. In that example, the first radio frequency band may be the unlicensed industrial, scientific, and medical (ISM) 2.4 GHz band. The term "Wi-Fi®" refers to interoperable implementations of the IEEE 802.11 family of WLAN standards certified by the Wi-Fi Alliance.

Figures 1, 2:
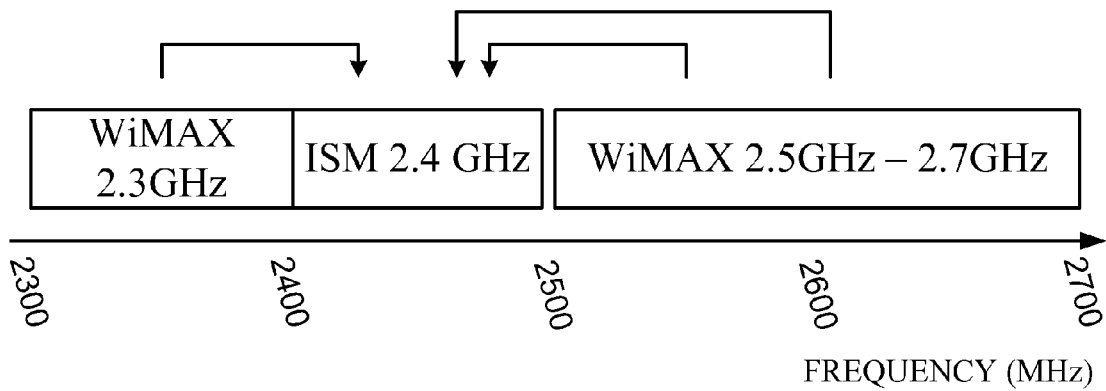
Figure 2:
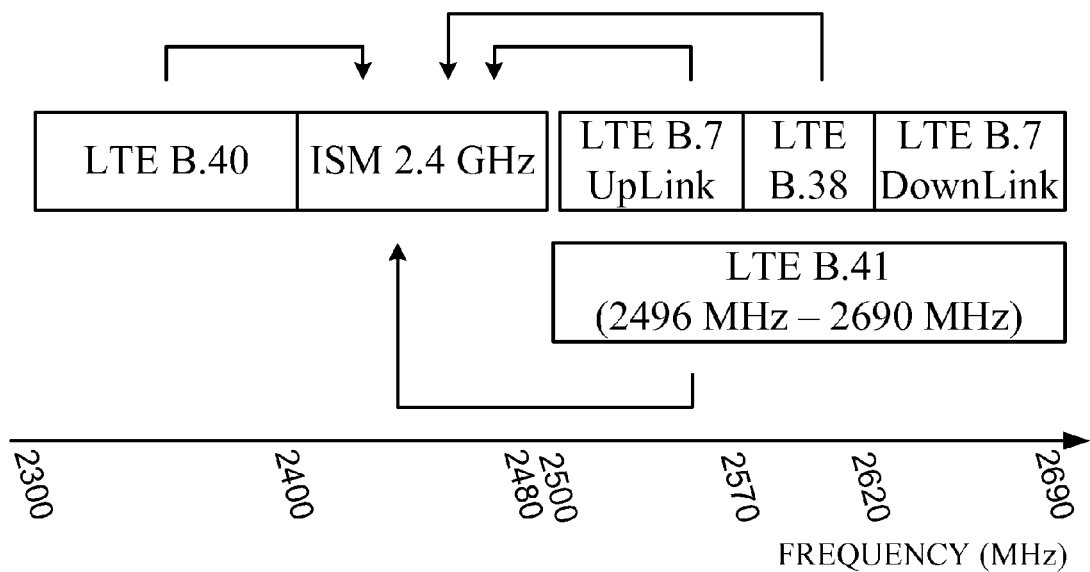

As illustrated in FIG. 2-1, certain frequency bands of IEEE 802.16 are adjacent or near the ISM 2.4 GHz band.

As illustrated in FIG. 2-2, certain operating bands of LTE, as defined in 3GPP TS36.36101-851, are adjacent or near the ISM 2.4 GHz band. Specifically, operating band 40 (LTE B40) is from 2300 MHz to 2400 MHz, operating band 41 (LTE B41) is from 2496 MHz to 2690 MHz, operating band 38 (LTE B38) is from 2570 MHz to 2620 MHz, and operating band 7 (LTE B7) is from 2500 MHz to 2570 MHz for the uplink and from 2620 MHz to 2690 MHz for the downlink.

Returning now to FIG. 1, the second communication module 111 is operable to connect to a wireless base station 124 that is compatible with the second wireless communication technology. The wireless base station 124 is part of an access network 126 that, together with a core network 128, enables the apparatus 100 to communicate with a destination network 130, for example, the Internet or a private internet. Specific details of access network 126 and core network 128 may depend on the nature of the second wireless communication technology. In the case that the second wireless communication technology is based on LTE or LTE-Advanced, the wireless base station 124 is referred to as evolved base node (eNB).

The first communication module 101 is operable to communicate with one or more client devices 132 that are compatible with the first wireless communication technology. When operating as a wireless access point (AP), the first communication module 101 therefore supports a wireless network 134 which the one or more client devices 132 may join. The client devices 132 may use the AP to access services and other devices via a distribution system (not shown). Alternatively, client devices 132 that have joined the wireless network 134 may use the AP for intra-networking to communicate—without traversing any distribution system (not shown)—with others of the client devices 132 that have joined the wireless network 134. A client device 132 communicating with the AP may be communicating on its own behalf, or may be serving as a mesh node in a mesh network (not shown) and therefore communicating with the AP on behalf of another client device (not shown) or another mesh node (not shown). The first communication module 101 may also be operable as a client device, however this document is concerned with its operation as an AP. In its operation as an AP, the first communication module 101 is operable to advertise support for one or more supported data rates, the one or more supported data rates belonging to a set of data rates permitted in the first wireless communication technology. For example, the advertisement may be made in beacon frames broadcasted on a regular basis by the first communication module 101, possibly in a Supported Rates element of the beacon frames or in an Extended Supported Rates element of the beacon frames. In another example, the advertisement may be made in a frame transmitted by the first communication module 101 in response to a query or request from a client device 132. Examples of such frames include Probe Response frames, Association Response frames, Reassociation Response frames, and the like.

A logical or physical bus 136 coupling BB processor 103 and BB processor 113 enables arbitration between first communication module 101 and second communication module 111 by an arbitrator (not shown).

For the uplink (that is, transmissions from a client device received by the AP), it is the client device that selects the data rate for communication, so long as the selected data rate is chosen from the one or more supported data rates. In IEEE 802.11n, the receiver (in this case, the AP) may suggest or recommend a particular data rate to the transmitter (in this case, the client device), however the transmitter is not obliged to choose the suggested or recommended rate.

To select a data rate for communication, the client device may typically start at the highest supported data rate as advertised by the AP. In the case of a failed transmission at the highest supported data rate (detected due to lack of receipt of an acknowledgement from the AP), the client device may attempt a retransmission. After a number of failed retransmissions, the client device may invoke a rate adaptation scheme to select a lower supported data rate, on the assumption that the channel conditions are too poor for the currently selected data rate. Rate adaptation schemes are proprietary and beyond the scope of this document.

Due to its convergence time, rate adaptation is most effective in combating constant interference and channels whose conditions vary slowly. LTE uplink traffic (that is, LTE traffic from an LTE UE to a base station) is scheduled by an LTE evolved base node (eNB) and the shortest transmission time interval is 1 ms in LTE. Due to the fact that the eNB uplink scheduling in general is based on the number of LTE UEs requesting uplink service, uplink channel quality of those UEs, and how to share the uplink time/frequency resources to maximize the uplink throughput, an LTE UE's uplink traffic may be bursty, in that relatively long periods of inactivity on the uplink are interspersed by sudden relatively short transmissions. Rate adaptation schemes are ill suited to channels experiencing interference from bursty transmissions.

In a first use scenario, referred to as "wireless backhaul", the first communication module 101, while operating as an AP, operates as a router/gateway to provide the one or more client devices 132 with access to the destination network 130, via the second communication module's connection to the base station 124. In this first use scenario, the apparatus 100 is referred to as a "mobile hotspot". In this first use scenario, transmissions from the second communication module 111 frequently occur simultaneously with reception by the first communication module 101, because the first communication module 101 and the second communication module 111 are being operated together for a single purpose—a connection between at least one of the client devices 132 and the destination network 130. Consider the example where a video generated by one of the client devices 132 is being uploaded to the server 138. In this example, the first communication module 101 will be receiving portions of the video from the client device 132 over the WLAN 134 and, at roughly the same time, the second communication module 111 will be transmitting portions of the video to the server 138 via the base station 124, the access network 126, the core network 128, and the destination network 130.

In a second use scenario, the first communication module 101, while operating as an AP, operates independently of the second communication module 111. For example, the apparatus 100 may use the second communication module 111 to receive streaming video from a server 138 coupled to the destination network 130, while client devices 132 communicate with one another via the first communication module 101. In another example, a user of the apparatus 100 may be conducting a telephone call via the second radio 112, while client devices 132 communicate with one another via the first communication module 101. In this second use scenario, transmissions from the transmitter 116 may occur simultaneously with reception by the receiver 114.

This paper proposes that the first communication module 101 refrains from advertising support for any data rate that is not expected to be sufficiently resilient in the face of interference caused by transmissions from the second communication module 111.

Advertise Support for Single Supported Data Rate

In one version, the first communication module 101 advertises support for a single supported data rate, and does not advertise support for any other data rate. That is, the first communication module 101 refrains from advertising support for any data rate other than the single supported data rate.

The single supported data rate may be the lowest data rate permitted in the first wireless communication technology. For example, in the case that the first wireless communication technology is based on legacy IEEE 802.11 (as released in 1997 and clarified in 1999) or based on IEEE 802.11b, the single supported data rate for which support is advertised may be 1 Mbps (mega bits per second), which is the lowest data rate permitted in the first wireless communication technology.

Alternatively, the single supported data rate may be the lowest data rate to be used with orthogonal frequency-division multiplexing (OFDM) permitted in the first wireless communication technology. For example, in the case that the first wireless communication technology is based on IEEE 802.11g or is backwards compatible to data rates permitted in IEEE 802.11g, the single supported data rate for which support is advertised may be 6 Mbps. In another example, in the case that the first wireless communication technology is based on IEEE 802.11n (without backwards compatibility to data rates permitted in IEEE 802.11g), the single supported data rate for which support is advertised may be 6.5 Mbps or 7.2 Mbps for a 20 MHz-wide channel and 13.5 Mbps or 15 Mbps for a 40 MHz-wide channel.

Typically, an AP will advertise support for all data rates in the set of permitted data rates, so that each client device will, in accordance with its rate adaptation scheme, select the highest permitted data rate that is suitable for the conditions of the communications channel between that client device and the AP. (As discussed in U.S. Pat. No. 7,873,017, some APs advertise support for the higher data rates in the set of permitted rates and refrain from advertising support for the lowest data rate or lower data rates in order to trigger client devices to roam to another AP when channel conditions deteriorate.)

Thus it is unexpected for the first communication module 101 to advertise support only for the lowest data rate permitted in the first wireless communication technology (or for the lowest data rate to be used with OFDM permitted in the first wireless communication technology) and to refrain from advertising support for any other data rate. However, by so doing, the first communication module 101 reduces—to the minimum possible value, considering that not all data rates are permitted in the first wireless communication technology—the SINR needed to communicate data at a predetermined quality, making it easier for the receiver 104 to receive data at the predetermined quality from the one or more client devices 132, despite interference from transmissions by the second radio 112.

Advertise Support for One or More Supported Data Rates that do not Exceed an Apparatus-Specific Channel-Specific Fixed Rate Threshold In another version, the first communication module 101 does not advertise support for any data rate that exceeds an apparatus-specific channel-specific fixed rate threshold, and advertises support for one or more supported data rates each of which does not exceed the fixed rate threshold. The fixed rate threshold for a specific apparatus such as apparatus 100 is defined as the rate at which data would be receivable on a specific channel at a predetermined quality by the first communication module 101 if the first communication module 101 were to receive the data in a signal to which a predicted SINR is applicable, the specific SINR taking into account a contribution of transmissions from the second communication module 111 to a predicted interference at the first communication module 101. The fixed rate threshold is fixed in the sense that i) the predicted SINR is calculated or estimated only once per channel for a specific apparatus 100, ii) the fixed rate threshold corresponding to the predicted SINR is determined only once per channel for a specific apparatus, and iii) the set of one or more supported data rates for which the specific apparatus advertises support does not change over time as long as first communication module 101 operates on a particular channel. The fixed rate threshold (and hence the set of one or more supported data rates for which support is advertised) may be different for different apparatuses 100.

The predetermined quality may be expressed, for example, as one or any combination of the following quality metrics: packet error rate, packet loss rate, block error rate, information bit error rate, coded bit error rate, number of retransmissions. For example, the predetermined quality may be that the packet error rate does not exceed 2%, and/or that the packet loss rate does not exceed 2%, and/or that the block error rate does not exceed 2%, and/or that the information bit error rate does not exceed 2%, and/or that the coded bit error rate does not exceed 2%, and/or the block (or frame) error rate does not exceed 10% for up to 4 retransmissions.

The specific SINR applicable to the first communication module 101 on a particular channel and taking into account a contribution of transmissions by the second communication module 111 to interference at the first communication module 101 may be calculated as follows:

$$\text{SINR(dB)} = RX\_RSSI(\text{dBm}/BW\text{ MHz}) - [\text{Noise} + TX\_\text{Interference}](\text{dBm}/BW\text{ MHz}) - \text{Noise\_Figure(dB)} \quad (1)$$

where RX_RSSI is the received signal strength indicator (RSSI) in dBm within a channel bandwidth of BW MHz at the antenna port of RX antenna 107, TX_Interference is the interference within a channel bandwidth of BW MHz at the antenna port of receiver antenna 107 due to transmissions from the second communication module 111, Noise is the thermal noise plus all interference (except TX_Interference) within a channel bandwidth of BW MHz at the antenna port of receiver antenna 107, and Noise_Figure is the distortion of the receiver path from the antenna port of receiver antenna 107 through to the baseband port of receiver 104, which includes receiver path internal thermal noise, implementation loss, etc. Note that the sum between Noise and TX_Interference is a linear scale sum. The linear scale sum is then converted to dB scale in units of (dBm/BW MHz).

RX_RSSI and TX_Interference may be estimated based on the power of the received signals (once down-converted to baseband frequencies), and based on the corresponding gains from the receiver antenna 107 to the receiver 104. For example, receiver 104 may measure a received signal power at baseband frequencies $RX\_RSSI_{BB}$ in (dBm/BW MHz) with a gain of $RX\_Gain_{RSSI}$(dB) and may measure a baseband transmission interference power $TX\_Interference_{BB}$ in (dBm/BW MHz) with a gain of $RX\_Gain_{TX\_Interference}$ (dB). In that case, RX_RSSI may be calculated as $RX\_RSSI=RX\_RSSI_{BB}-RX\_Gain_{RSSI}$ and TX_Interference may be calculated as $TX\_Interference=TX\_Interference_{BB}-RX\_Gain_{TX\_Interference}$.

The value of Noise may be estimated based on the received signals (once down-converted to baseband frequencies) during a "silent" time interval when there is no transmission from the second communication module 111. Alternatively, sources of interference other TX_Interference may be ignored, and the value of Noise may be estimated as the thermal noise, which power can be calculated if the temperature is known. Values for Noise_Figure may be calibrated and stored in a table.

The value of TX_Interference may be calculated from the antenna isolation, the co-existence filter attenuation (if present), and the maximum transmit power configured in the transmitter 116. Lab bench measurements of the antenna isolation between the receiver antenna 107 and the transmitter antenna 118 may be different from those observed during actual use due to the effect that holding the apparatus 100 in one's hand may have on the antenna isolation. The calculation of TX_Interference may be based on a conservative estimate of the antenna isolation that takes this issue into account.

Alternatively, the apparatus 100 may be configurable regarding the distances at which the first communication module 101 is to be operable, and the value of RX_RSSI may be a particular RSSI value assigned to a particular indicated distance configured in the apparatus 100. For example, the apparatus 100 may be configured for usage of the first communication module 101 for "short-range communications" to which an example RSSI value of −50 dBm is assigned, or may be configured for usage of the first communication module 101 for "long-range communications" to which an example RSSI value of −80 dBm is assigned. The use of "short-range" and "long-range" in this document is to provide a relative reference, and is not intended to be understood as an absolute term. That is, "short-range" communications are of short range in that they occur over a shorter distance than "long-range" communications, and "long-range" communications are of long range in that they occur over a longer distance than "short-range" communications.

Consider the following example. The first communication module 101, compatible with a first wireless communication technology based on IEEE 802.11n, is tuned to a channel of 20 MHz bandwidth, and the second radio is operable on a channel of 20 MHz bandwidth in LTE B40 with greater than 25 MHz frequency separation. There is an antenna isolation of 15 dB, augmented by a co-existence filter providing 40 dB of attenuation. The 3GPP TS36.101 document allows out-of-band emissions at −30 dBm/MHz. Vendors of LTE UE may improve out-of-band emissions by an additional 10 dB, that is, to −40 dBm/MHz.

Thus TX_Interference in dBm with a 20 MHz channel could be:

$$-30\ dBm/MHz + 10\ \log_{10} 20\ MHz - 10\ dB - 15\ dB - 40\ dB = -82\ dBm/20\ MHz$$

where the sum of −30 dBm/MHz and $10 \log_{10} 20$ MHz is the power in dBm within a 20 MHz band, −10 dB is a possible vendor improvement, −15 dB is the antenna isolation, and −40 dB is the filter attenuation.

Further, assuming a value of −64 dBm/20 MHz for RX_RSSI, a value of −174 dBm/Hz=−114 dBm/1 MHz, for thermal Noise at room temperature (ignoring other interference), and a typical value of 6 dB for Noise_Figure, the resulting SINR based on Equation 1 is given by:

$$SINR(dB) = -64\ dBm/20\ MHz - [(-114\ dBm/1\ MHz)_{LIN} + (-82\ dBm/20\ MHz)_{LIN}](dBm/20\ MHz) - 6\ dB \quad (2)$$

where $(x)_{LIN}$ means to convert x in dB scale to a value in linear scale, i.e., $(x)_{LIN}=10^{(x/10)}$.

The resulting SINR is about 12 dB. The corresponding data rate with packet error rate less than 2% under this estimated SINR may be 12 Mbps. As a result, the rate threshold can be set to 12 Mbps. In this example, in the case that the first wireless communication technology is based on IEEE 802.11b, the first communication module 101 may advertise support for the following data rates: 1 Mbps, 2 Mbps, 5.5 Mbps and 11 Mbps (or, as explained above with respect to U.S. Pat. No. 7,873,017, may advertise support only for 2 Mbps, 5.5 Mbps and 11 Mbps, or only for 5.5 Mbps and 11 Mbps). In this example, in the case that the first wireless communication technology is based on IEEE 802.11g, the first communication module 101 may advertise support for the following data rates: 1 Mbps, 2 Mbps, 5.5 Mbps, 6 Mbps, 9 Mbps, 11 Mbps and 12 Mbps (or only some of those data rates), and will refrain from advertising support for any data rate that exceeds 12 Mbps.

For comparison, a received signal strength indicator (RSSI) of −64 dBm at the first radio in the absence of TX_Interference would result in an SINR of about 31 dB if using Equation 2 and removing the component of −82 dBm/20 MHz for TX_Interference. At that SINR level, a data rate of 54 Mbps could typically be supported.

As noted above, typically, an AP will advertise support for all data rates in the set of permitted data rates, so that each client device will, in accordance with its rate adaptation scheme, select the highest permitted data rate that is suitable for the conditions of the communications channel between that client device and the AP. As discussed in U.S. Pat. No. 7,873,017, some APs advertise support for the higher data rates in the set of permitted rates and refrain from advertising support for the lowest data rate or lower data rates in order to trigger client devices to roam to another AP when channel conditions deteriorate. Advertisement of support for data rates by a typical AP is independent of the channel conditions and is independent of any expectation of channel conditions.

Thus it is unexpected for the first communication module 101 to advertise support only for data rates permitted in the first wireless communication technology that do not exceed the fixed threshold and to refrain from advertising support for any other data rate. However, by so doing, the first communication module 101 may restrict communications in the wireless network 134 to one or more data rates that are expected to be sufficient in the presence of interference from transmissions from the second communication module 111, making it possible for communications in the wireless network 134 to co-exist with simultaneous transmissions from the second communication module 111. Furthermore, because the fixed rate threshold is defined as the rate at which data would be receivable at a predetermined quality by the first communication module 101 if the first communication module 101 were to receive the data in a signal to which a specific SINR is applicable, the specific SINR taking into account a contribution of transmissions by the second communication module 111 to interference at the first communication module 101, the fixed rate threshold may be higher than two or more of the data rates permitted in the first wireless communication technology, and as such higher throughput may be achievable in the wireless network 134 than if the first communication module 101 were to advertise support only for the lowest data rate permitted in the first wireless communication technology.

Figure 3:
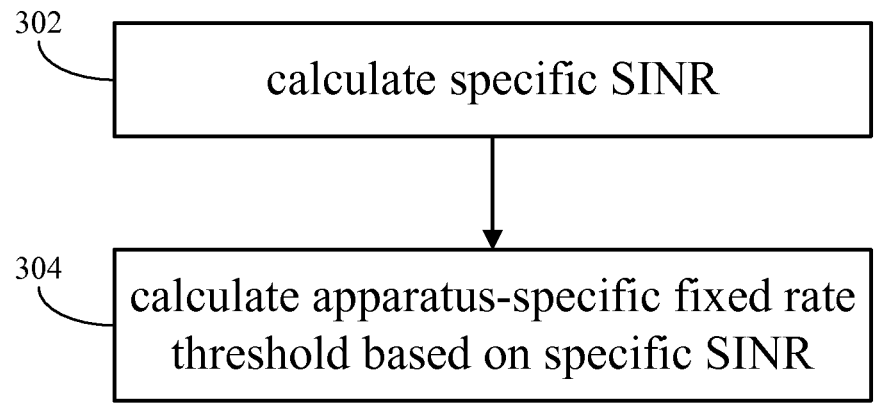
FIG. 3 is a flowchart of an example method for calculating an apparatus-specific fixed rate threshold.

FIG. 3 is a flowchart of an example method for calculating an apparatus-specific fixed rate threshold. The example method may be performed in a controlled environment, for example, in a laboratory or by the manufacturer of apparatus 100 or by the manufacturer of a part or a sub-assembly to be included in apparatus 100. Alternatively, the example method may be performed by the apparatus 100 according to a configuration in the apparatus regarding the distances at which the first communication module 101 is to be operable. At 302, a specific predicted SINR is calculated, possibly using a particular RSSI value assigned to a particular indicated distance configured in the apparatus. Subsequently, at 304, the fixed threshold is calculated based on the specific SINR calculated at 302.

Figure 4:
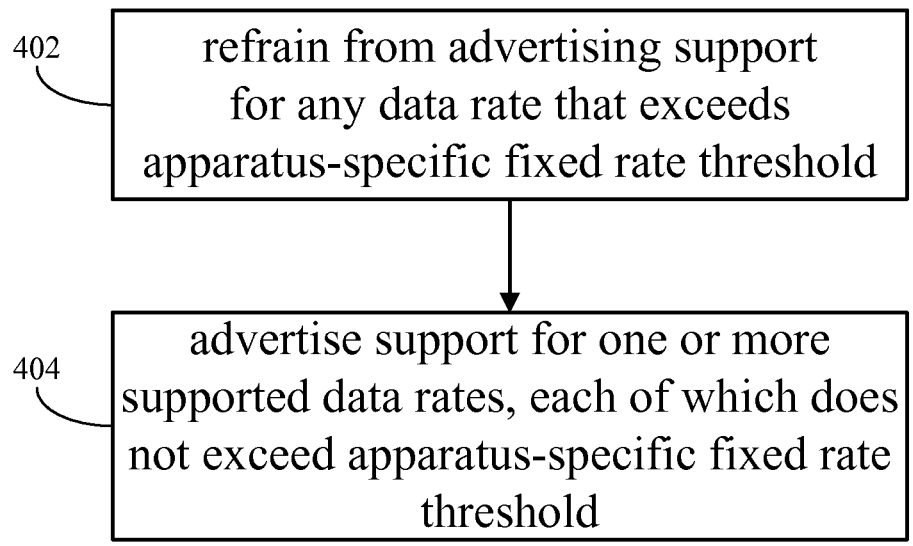
FIG. 4 is a flowchart of an example method for advertising support for one or more data rates.

FIG. 4 is a flowchart of an example method for advertising support for one or more data rates. The example method may be performed by the first communication module 111, when operating as an AP. The first communication module refrains (402) from advertising support for any data rate that exceeds the fixed threshold, and advertises (404) support for one or more supported data rates, each of which does not exceed the apparatus-specific fixed rate threshold.

Advertise Support for One or More Supported Data Rates that do not Exceed a Dynamic Rate Threshold In yet another version, the first communication module 101 does not advertise support for any data rate that exceeds a dynamic rate threshold, and advertises support for one or more supported data rates each of which does not exceed the dynamic rate threshold. The dynamic rate threshold for a specific apparatus such as apparatus 100 is defined as the rate at which data would be receivable at a predetermined quality by the first communication module 101 if the first communication module 101 were to receive the data in a signal to which a specific SINR is applicable, the specific SINR taking into account a contribution of transmissions by the second communication module 111 to interference at the first communication module 101. The specific SINR is estimated or predicted. The dynamic rate threshold is changeable in the sense that the specific SINR (and hence the corresponding dynamic rate threshold) is recalculated at different times for a particular apparatus 100, and the set of one or more supported data rates for which the particular apparatus 100 advertises support may change over time. The dynamic rate threshold (and hence the set of one or more supported data rates for which support is advertised) may be different for different apparatuses 100.

As in the case of the apparatus-specific fixed rate threshold, the predetermined quality may be expressed, for example, as one or any combination of the following quality metrics: packet error rate, packet loss rate, block error rate, information bit error rate, coded bit error rate, number of retransmissions. For example, the predetermined quality may be that the packet error rate does not exceed 2%, and/or that the packet loss rate does not exceed 2%, and/or that the block error rate does not exceed 2%, and/or that the information bit error rate does not exceed 2%, and/or that the coded bit error rate does not exceed 2%, and/or the block (or frame) error rate does not exceed 10% for up to 4 retransmissions.

The specific SINR applicable to the first communication module 101 and taking into account a contribution of transmissions by the second communication module 111 to interference at the first communication module 101 may be calculated at any time t as follows:

$$\text{SINR}(t)(\text{dB}) = RX\_RSSI(t)(\text{dBm}/BW\,\text{MHz}) - [\text{Noise}(t) + TX\_\text{Interference}(t)](\text{dBm}/BW\,\text{MHz}) - \text{Noise\_Figure}(t)(\text{dB}) \quad (3)$$

where RX_RSSI(t), Noise(t), TX_Interference(t), and Noise_Figure(t) are the time-varying counterparts of RX_RSSI, Noise, TX_Interference, and Noise_Figure, respectively, defined above with respect to Equation 1. Here, time t may be a time instant for a near future. In that case, the specific SINR(t) is a predicted SINR for the anticipated TX_Interference(t) to be experienced by the receiver 104.

The value of TX_Interference(t) may be calculated from the antenna isolation, the co-existence filter attenuation (if present), an instantaneous transmit power, and an instantaneous uplink time/frequency resource configuration configured at time t in the transmitter 116. Lab bench measurements of the antenna isolation between the receiver antenna 107 and the transmitter antenna 118 may be different from those observed during actual use due to the effect that holding the apparatus 100 in one's hand may have on the antenna isolation. The calculation of TX_Interference(t) may be based on a conservative estimate of the antenna isolation that takes this issue into account. Alternatively, a table of orientation-dependent antenna isolation values may be established for a particular apparatus 100 and an entry in the table may be used in the calculation of TX_Interference(t) based on the spatial orientation of the apparatus 100 at time t. When time t is a time instant for a near future, TX_Interference(t) is an anticipated interference due to the possible transmission of the second communication module 111.

At the first communication module 101, operating as an AP, a client-specific average RX_RSSI is estimated. An example average RX_RSSI(t, k) for client k at time t is an infinite impulse response (IIR) filtering of the latest RSSI for $$RX\_RSSI\_Avg(t,k) = \alpha \cdot RX\_RSSI\_Avg(t,k) + (1-\alpha) \cdot RX\_RSSI(t,k) \quad (4)$$

where α is an IIR filter forgetting factor, RX_RSSI(t, k) is the latest RSSI for client k from a recently received signal originating from client k. When time t is a time instant for a near future, this latest RSSI is used to predict RSSI in the near future. This IIR filtering is updated for client k only when there is a received signal originating from client k.

The first communication module 101 may use as RX_RSSI(t) in the SINR calculation the largest value from the set {RX_RSSI_Avg(t, k); k from all clients} or an average of all the values in that set. Alternatively, the first communication module 101 may use as RX_RSSI(t) in the SINR calculation the largest value from the set {β(t, k)·RX_RSSI_Avg(t, k); k from all clients}, where β(t, k) is a time-dependent scaling factor that is set to a larger value for a client that frequently transmits data to the AP and that is set to a smaller value for a client that seldom transmits data to the AP. For example, β(t, k) may be calculated as $\beta^{\Delta T(k)}$, where β is a constant and ΔT(k) is the time interval between a most recent reception from the client k and a second most recent reception from the client k.

In the case that the wireless network 134 uses a transmit power control scheme, signals from different client devices will be received at the receiver 104 with similar RSSI, thus selecting the largest value from the set {RX_RSSI_Avg(t, k); k from all clients} or an average of all the values in that set will yield roughly the same result. In the case that the wireless network 134 does not use a transmit power control scheme, selecting the largest value from the set {RX_RSSI_Avg(t, k); k from all clients} is effectively contemplating a worst-case scenario.

The calculation of the value of TX_Interference(t) from the instantaneous transmit power configured at time t in the transmitter 116 is to be contrasted with the case of the apparatus-specific fixed rate threshold, where the value of TX_Interference may be calculated from the maximum transmit power configured in the transmitter 116. Some wireless communication technologies, for example, LTE and LTE Advanced, incorporate aggressive power control techniques, and it is unlikely that a transmitter of a user equipment compatible with such a wireless communication technology would operate at the maximum transmit power for extended periods of time. Due to the macro-cell nature of LTE and the signaling overhead to changing the transmit power of an LTE UE, this transmit power may not change over a certain time period (for example, tens of milliseconds). However, if this transmit power does change on a short time scale (in LTE, the smallest uplink scheduling time interval is 1 millisecond), then cushioning may be used to prevent frequent changes in the calculation of the estimated SINR. For example, the cushioning may be effected by defining power levels each corresponding to a different range of transmit powers, and updating the calculation of the estimated SINR only if the instantaneous transmit power changes from one defined power level to another defined power level.

As an alternative to calculating the value of TX_Interference(t), the apparatus 100 may store a relation table relating different configurations of the transmitter to values from which TX_Interference(t) can be estimated.

This relation table may be a set of baseband amplitude frequency response values $A_{TX\_Interference}(f_{BB}, f_{RF1}, f_{RF2})$ in dB at a baseband frequency point $f_{BB}$ for a baseband impulse transmitted from the second transmitter 116 operating at radio frequency $f_{RF2}$ via transmitter antenna 118, to the first baseband processor 103, receiving from receiver antenna 107 and receiver 104 operating at radio frequency $f_{RF1}$.

For a given set of $f_{RF1}$ and $f_{RF2}$, $A_{TX\_Interference}(f_{BB}, f_{RF1}, f_{RF2})$ can be measured, in a lab environment, within a Δf MHz frequency interval centered at frequency point $f_{BB}$ over a baseband frequency range $[f_{MIN}, f_{MAX}]$ of interest to the first baseband processor 103. If the bandwidth of the first radio is 20 MHz (20 MHz is a legacy channel bandwidth; IEEE 802.11n allows a channel bandwidth of 40 MHz), the baseband frequency range is from −10 MHz to +10 MHz.

The amplitude frequency response corresponding to 0 dBm/Δf MHz transmit power and 0 dB RX gain for the receive path from receiver antenna 107 to the baseband port of the receiver 104 is stored.

The set of $f_{RF1}$ and $f_{RF2}$ depends on the bands that the apparatus supports. To limit the relation table size, when the RF frequency separation is larger than a threshold, that is, $|f_{RF1}-f_{RF2}|>\text{Threshold\_}\Delta f_{RF}$, their amplitude frequency response will not be stored.

Based on an equivalent baseband transmit power $P_{TX}(f, t)$ defined as the baseband transmit power within a Δf MHz frequency interval centered at frequency point $f_{BB}$ for time t in the transmitter 116, the corresponding TX_Interference(t) from the second radio 112 to the receiver antenna 107 can be estimated as:

$$TX\_Interference(f,t)(\text{dBm}/\Delta f\,\text{MHz})=P_{TX}(f,t)(\text{dBm}/\Delta f\,\text{MHz})+A_{TX\_Interference}(f_{BB},f_{RF1},f_{RF2})(\text{dB}) \quad (5)$$

where Δf MHz is a small frequency interval around frequency f used to measure the power at the frequency f. When time t is a time instant for a near future, the transmit power $P_{TX}(f, t)$ will be the configured transmit power for a scheduled transmission at time t.

Across the frequency range $[f_{MIN}, f_{MAX}]$, Δf could be equally spaced or dependent on the frequency point f. The selection of Δf determines the number of frequency points within the frequency range $[f_{MIN}, f_{MAX}]$. For an equally spaced Δf, the number of frequency points equals $(f_{MAX}-f_{MIN})/\Delta f$. In one example, Δf is equally spaced and set to 15 kHz, the same subcarrier spacing as used in the 3GPP LTE. In another example, Δf is equally spaced and set to 200 kHz in order to reduce the number of frequency points over which the amplitude frequency responses are to be estimated and stored in the relation table. $P_{TX}(f, t)$ is the baseband transmit power within a Δf MHz frequency interval centered at frequency point f and for time t. $P_{TX}(f, t)$ can be understood as a power spectrum density in units of dBm/Δf MHz.

The overall TX_Interference(t) is an integration of TX_Interference(f, t) by summing up all TX_Interference(f, t) over all frequency points of interest.

In the case that the second radio 112 is for an OFDM system, the transmission of a baseband impulse can also be understood as a transmission of frequency domain symbols.

It is possible that $A_{TX\_Interference}(f)$ is dependent on the total transmit power (as the power amplifier in the second radio 112 may use different power modes and they may have different impacts on the amplitude frequency response from transmission interference). Therefore, there might be more than one relation table to store $A_{TX\_Interference}(f)$ for different total transmit power levels. The SINR estimator at the baseband processor 103 may select a relation table corresponding to the anticipated total transmit power at the transmitter antenna 118.

The apparatus 100 may look up the appropriate value of $A_{TX\_Interference}(f)$ in the table according to the current configuration of the transmitter 116, for use in the calculation of the TX_Interference(f, t), and hence an estimated SINR.

In the case that the second wireless communication technology is based on LTE or LTE-Advanced or future related standards, the configurations used in $P_{TX}(f, t)$ for the calculation of TX_Interference(f, t) in Equation 5 may include one or any combination of the following factors:

the total transmit power (or a range of transmit powers to which the total transmit power belongs)
the number of resource blocks being occupied
the location of the occupied resource blocks Different types of LTE transmission (for example, physical uplink control channel (PUCCH), physical uplink shared channel (PUSCH) with or without inter-slot hopping, physical random access channel (PRACH), sounding reference signal (SRS), etc., may occupy different resource blocks at different locations. For PUSCH with inter-slot hopping, the location of the occupied resource blocks may change from one time slot (0.5 ms) to another, and as such, the corresponding $P_{TX}(f, t)$ will change and the resulting TX_Interference(f, t) may change.

Figure 5:
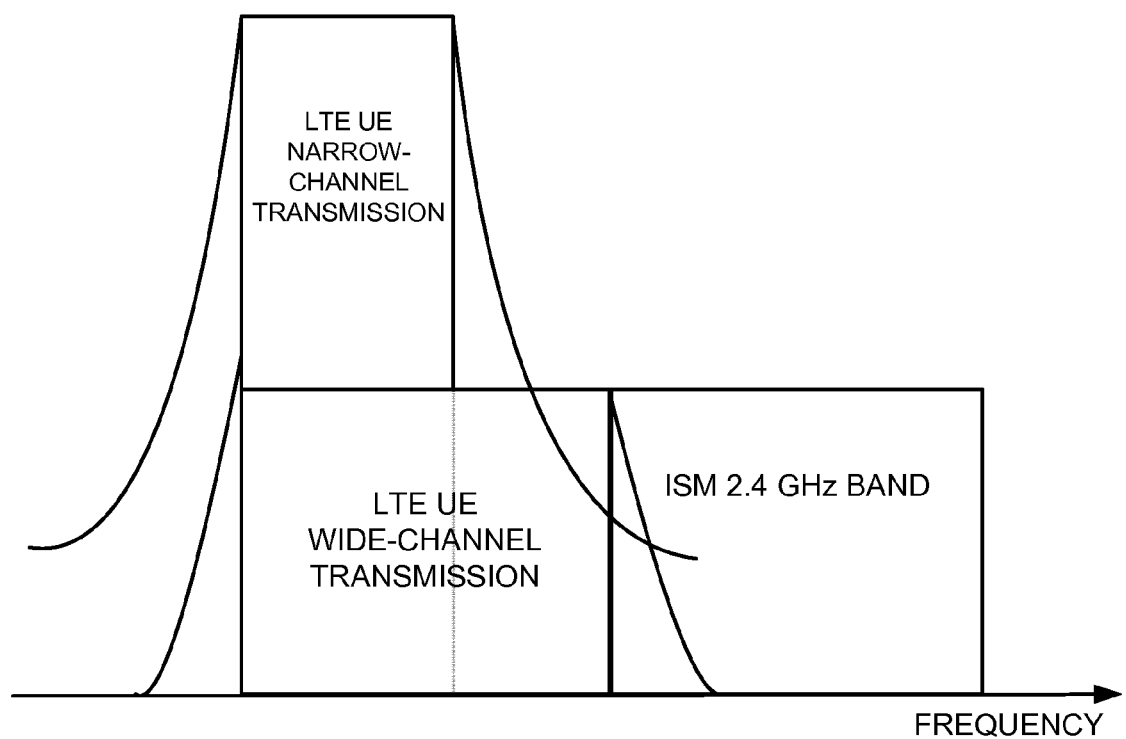
FIG. 5 illustrates the transmission power spectrum density for LTE user equipment transmissions in an example narrow-band channel transmission and for LTE user equipment transmissions in an example wide-band channel transmission, both transmission bands proximate to the ISM 2.4 GHz band.

The number of resource blocks being occupied and the location of the occupied resource blocks are included in the list of factors because LTE permits channels of different bandwidths. For example, channel bandwidths of 5 MHz, 10 MHz, 15 MHz and 20 MHz are supported in LTE B7, LTE B38, LTE B40, and LTE B41. If an LTE user equipment (for example, apparatus 100) uses the same transmit power for a transmission in a narrow channel as for a transmission in a wide channel, the transmission power spectrum (that is, the power levels in a small number of frequency intervals) will be higher and its emission to the ISM 2.4 GHz band will still be there, as illustrated in FIG. 5. The degree of the emission depends on the power spectral density (PSD) level, that is, $P_{TX}(f, t)$ in Equation 5, and how far the narrow channel is from the ISM 2.4 GHz band.

During an actual transmission by the transmitter 116, the first communication module 101 may estimate the amplitude frequency response from the transmitter 116 to the receiver 104 due to the actual transmission and may update the value of TX_Interference in the table that corresponds to the configuration of the transmitter 116 at the time of the actual transmission. The estimation may be performed as follows:

1) The receiver 104 may estimate a noise baseline reference NoiseRef$_{BB}$(f$_{BB}$) at one or more frequency points f$_{BB}$ in the absence of transmissions from the second communication module 111. Note that the interference from sources other than transmissions from the second communication module 111 has been included into this estimated noise baseline reference. The estimation can be done by subtracting from the received signal the successfully decoded signal if the decoding was successful and passed its cyclic redundancy check (CRC). Otherwise, the value of NoiseRef$_{BB}$ (f$_{BB}$) is not updated. A value denoted by RX_Gain$_{NoTX\_Interference}$ is assumed to be the RX gain at the time of estimation. The noise baseline reference at the antenna 107 at the time t can be written as:

$$\text{NoiseRef}_{RF}(f_{BB},t) = \text{NoiseRef}_{BB}(f_{BB},t) - \text{RX\_Gain}_{TX\_Interference}(t)$$

A time average filter may be used to filter NoiseRef(f$_{BB}$, t), resulting in AvgNoiseRef$_{RF}$(f$_{BB}$, t).

2) In the presence of a transmission from the second communication module 111, the receiver 104 can estimate noise-plus-interference. The resulting estimation is referred to as NoiseInf(f$_{BB}$). A value denoted by RX_Gain$_{WithTX\_Interference}$, which is known to the receiver 104, is assumed to be the RX gain value during this estimation. The noise plus interference at the antenna 107 at the time t can be written as:

$$\text{NoiseTxInf}_{RF}(f_{BB},t) = \text{NoiseTxInf}_{BB}(f_{BB},t) - \text{RX\_Gain}_{WithTX\_Interference}(t)$$

The noise-plus-interference when the transmission power is at 0 dBm/Δf MHz at can be calculated as:

$$\text{NoiseTxInf0 dBm}_{RF}(f_{BB},t) = \text{NoiseTxInf}_{RF}(f_{BB},t) - \text{TxPower}(f_{BB},t)$$

where TxPower is the transmit power in units of 0 dBm/Δf MHz at the antenna 118. The TxPower is configured by second baseband processor 113 and can be made known to the first baseband processor 103. A time average filter may be used to filter NoiseTxInf0 dBm$_{RF}$(f$_{BB}$, t), resulting in AvgNoiseTxInf0 dBm$_{RF}$(f$_{BB}$, t).

3) The amplitude frequency response for the frequency point f$_{BB}$ can be calculated as:

$$A_{TX\_Interference}(f_{BB}, f_{RF1}, f_{RF2}) = \text{AvgNoiseTxInf0 dBm}_{RF}(f_{BB},t) - \text{AvgNoiseRef}_{RF}(f_{BB},t)$$

where f$_{RF1}$ and f$_{RF2}$ are the operating radio frequencies of the receiver 104 and of the transmitter 116, respectively, under which the noise baseline reference and the noise-plus-interference were estimated.

Alternatively, an amplitude frequency response analyzer can be designed to analyze the received baseband samples from the receiver 104 and to compare them to the transmitted baseband samples from the transmitter 116. After that, baseband amplitude frequency response values A$_{TX\_Interference}$ (f$_{BB}$, f$_{RF1}$, f$_{RF2}$) can be determined, based on which a relation table may be established for the use of calculating the value of TX_Interference(t).

A change in the estimated SINR will result in a change in the dynamic rate threshold. Not all changes of the dynamic rate threshold will change which of the data rates permitted in the first wireless communication technology do not exceed the dynamic rate threshold. For example, in the situation where the dynamic rate threshold changes from 6 Mpbs to 8 Mbps or vice versa, the IEEE 802.11g data rates 1 Mbps, 2 Mbps, 5.5 Mbps, and 6 Mbps will still not exceed the dynamic rate threshold, and the higher IEEE 802.11g data rates (9 Mbps, 11 Mbps, 12 Mpbs, . . . ) will still exceed the dynamic rate threshold. However, some changes of the dynamic rate threshold will result in either a smaller number or a larger number of data rates that do not exceed the dynamic rate threshold, relative to the number of data rates that did not exceed the dynamic rate threshold prior to the change. For example, in the situation where the dynamic rate threshold changes from 9 Mbps to 13 Mbps (for example, due to a decrease in the instantaneous transmit power configured in the transmitter 116), the IEEE 802.11g data rates 11 Mbps and 12 Mbps which exceeded the previous value of the dynamic rate threshold will not exceed the new value of the dynamic rate threshold. In another example, in the situation where the dynamic rate threshold changes from 6 Mbps to 4 Mbps (for example, due to a change in the configuration of the transmitter 116), the IEEE 802.11g data rates 5.5 Mbps and 6 Mbps which did not exceed the previous value of the dynamic rate threshold will exceed the new value of the dynamic rate threshold. In such cases, the first communication module 101 may update its advertised support for data rates to reflect this. For example, the first communication module 101 may, as a consequence of the change in the dynamic rate threshold to 13 Mbps, advertise support for the following data rates: 1 Mbps, 2 Mbps, 5.5 Mbps, 6 Mbps, 9 Mbps, 11 Mbps and 12 Mbps (or only some of those data rates) and may refrain from advertising support for any data rate that exceeds 13 Mbps. In another example, the first communication module 101 may, as a consequence of the change in the dynamic rate threshold to 4 Mbps, advertise support for the following data rates: 1 Mbps and 2 Mbps and may refrain from advertising support for any data rate that exceeds 4 Mbps.

As noted in examples above, the advertisement may be made in beacon frames broadcasted on a regular basis by the RF transmitter 106, or may be made in a frame transmitted by the RF transmitter 106 in response to a query or request from a client device 132. In the case that the change in the dynamic rate threshold increases or decreases the number of data rates that do not exceed the dynamic rate threshold, the advertisement prior to the change may differ from the advertisement after the change. Client devices 132 that are newly arriving in the coverage area of the wireless network 134 will communicate with the first communication module 101 only at data rates that, per the advertisement after the change, are supported. Client devices 132 that previously joined the wireless network 134 may be required, after an update period of time, to restrict their communications in the wireless network 134 to the data rates that, per the advertisement after the change, are supported.

In the case that the change in the dynamic rate threshold increases or decreases the number of data rates that do not exceed the dynamic rate threshold, the first communication module 101 may trigger a disassociation between the first communication module 101 and any client devices 132 that are associated to the first communication module 101.

For the example where the first communication technology is based on IEEE 802.11, the triggering may be effected by the first communication module 101 generating and sending a Disassociation frame with a specific Reason Code that, following receipt by a particular client device, results in that client device 132 sending an Association Request frame or a Reassociation Request frame to the first communication module 101. Receipt of the Association Request frame or of the Reassociation Request frame by the first communication module 101 will result in the first communication module 101 responding to that client device 132 with an Association Response frame or with a Reassociation Response frame in which the advertisement is an advertisement of support for the data rates that do not exceed the new threshold.

IEEE Std. 802.11™-2012 discloses the Disassociation frame format in section 8.3.3.4. The frame body of a management frame of subtype Disassociation contains the information shown in Table 8-21 of IEEE Std. 802.11™-2012:

TABLE 8-21

Disassociation frame body

| Order | Information |
|---|---|
| 1 | Reason code |
| 2-(Last – 1) | One or more vendor-specific elements are optionally present |
| Last | The Management MIC element (MME) is present when management frame protection is enabled at the AP and the frame is a group addressed frame. |

NOTE
The MME appears after all fields that it protects. Therefore, it appears last in the frame body to protect the frames as specified in 11.4.4.

As disclosed in section 8.4.1.7 of IEEE Std. 802.11™-2012, "This Reason Code field is used to indicate the reason that an unsolicited notification management frame of type Disassociation, Deauthentication, DELTS, DELBA, DLS Teardown, or Mesh Peering Close was generated . . . . The length of the Reason Code field is two octets." The reason codes are defined in Table 8-36 of IEEE Std. 802.11™-2012, where different meanings have been assigned to reasons 0 through 66 and reasons 67 through 65,535 have been reserved for future use.

This paper proposes adding a new reason code, for example, reason code 67, to have the meaning "Disassociated because of change in advertisement of data rates". Responsive to a change in the rate threshold increases or decreases the number of data rates that do not exceed the rate threshold, the first communication module 101 may follow the AP disassociation initiation procedure described in 10.3.5.8 of IEEE Std. 802.11™-2012, using the new reason code. The client device receiving the Disassociation frame with the new reason code may follow the Non-AP STA disassociation receipt procedure described in 10.3.5.7 of IEEE Std. 802.11™-2012, except that the client device attempts association or reassociation with the AP immediately, without waiting 2 seconds from receipt of the Disassociation frame.

Figure 6:
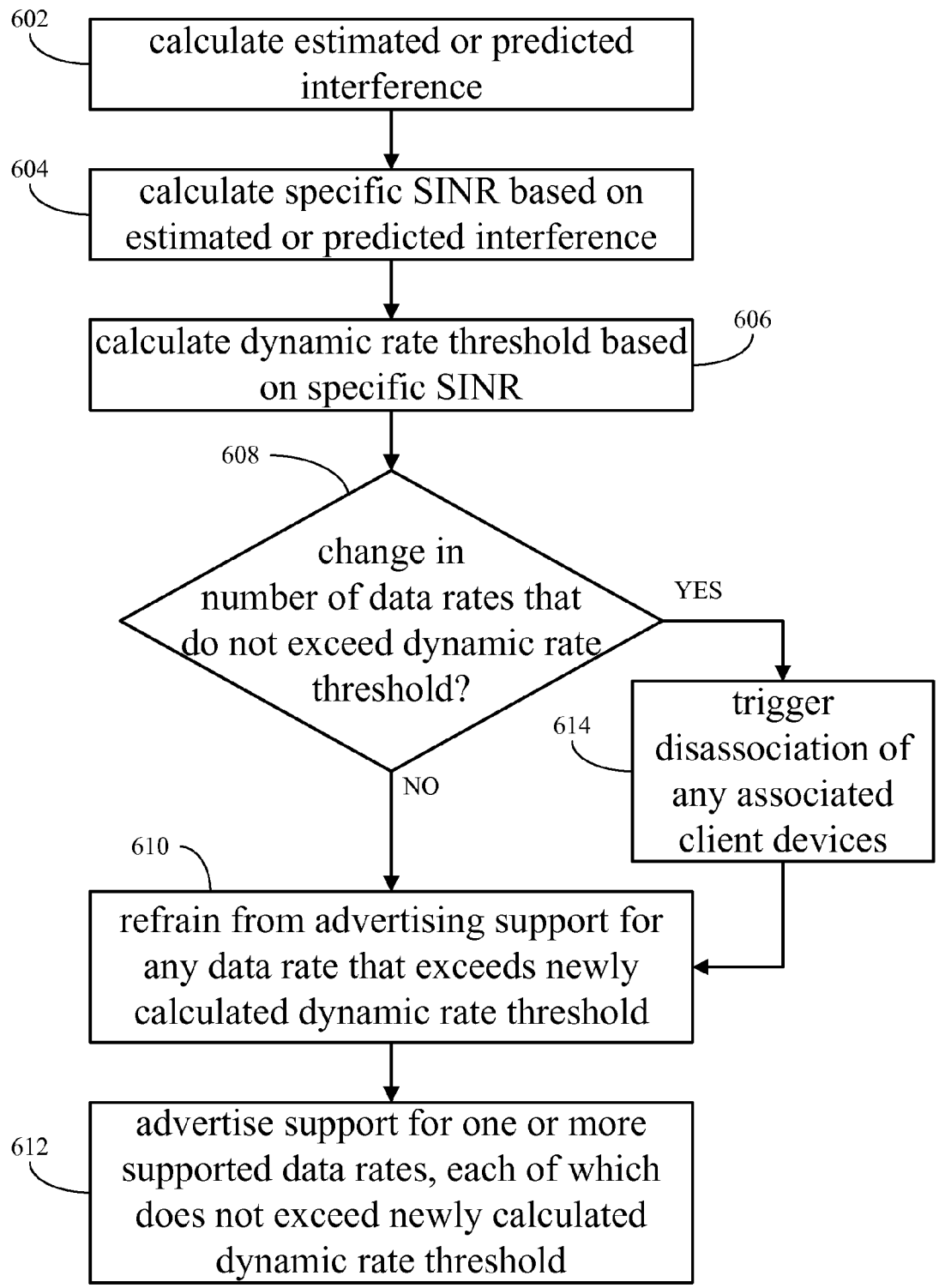
FIG. 6 is a flowchart of an example method for calculating a dynamic rate threshold and for advertising support for one or more data rates.

FIG. 6 is a flowchart of an example method for calculating a dynamic rate threshold and for advertising support for one or more data rates. The method may be performed by the first communication module 101, alone or jointly with a host processor of the apparatus 100. The estimated interference TX_Interference(t) due to transmissions from the second communication module is calculated (at 602). The specific SINR(t) is calculated (at 604) based on the estimated interference. The dynamic rate threshold is then calculated (at 606) or otherwise determined based on the specific SINR(t), the dynamic rate threshold being the rate at which data would be receivable at a predetermined quality by the first communication module 101 if the first communication module 101 were to receive the data in a signal to which the specific SINR(t) is applicable.

It is checked (at 608) whether there is any change in the number of data rates that do not exceed the dynamic rate threshold. That is, prior to the most recent calculation of the dynamic rate threshold, an integer number M data rates belonging to the set of data rates permitted in the first wireless communication technology did not exceed the previously-calculated dynamic rate threshold, where M is greater than or equal to 1, and now an integer number N data rates belonging to the set of data rates permitted in the first wireless communication technology do not exceed the newly-calculated dynamic rate threshold (calculated at 606), where N is greater than or equal to 1. The check at 608 is to determine whether M is equal to N. It is not a check whether the previously-calculated dynamic rate threshold is equal to the newly-calculated dynamic rate threshold.

If there is no change in the number of data rates that do not exceed the dynamic rate threshold, that is, M is equal to N, then the first communication module 101 continues to refrain (at 610) from advertising support for any data rate that exceeds the newly-calculated dynamic rate threshold and continues to advertise (at 612) support for one or more supported data rates, each of which does not exceed the newly-calculated dynamic rate threshold.

If there is a change in the number of data rates that do not exceed the dynamic rate threshold, that is, M is not equal to N, then the first communication module 101 may trigger (at 614) disassociation of any associated client devices, and the first communication module 101 refrains (at 610) from advertising support for any data rate that exceeds the newly-calculated dynamic rate threshold and advertises (at 612) support for one or more supported data rates, each of which does not exceed the newly-calculated dynamic rate threshold. During the association or reassociation process, the client devices that were previously associated and then disassociated due to the trigger at 614 will receive the advertisement of support for one or more supported data rates, each of which does not exceed the newly-calculated dynamic rate threshold.

LTE Refinements

LTE B.38, LTE B.40 and LTE B.41 are for use in a time-division duplex (TDD) mode. Each LTE frame in TDD mode is of 10 ms duration. Within each frame, there are 10 subframes (each of duration 1 ms) with two slots (each of duration 0.5 ms) in each subframe. Within each slot, there are 7 OFDM symbols with the normal Cyclic Prefix (CP) case or 6 OFDM symbols with the extended CP case. Special subframes are specifically defined for backward compatibility with Time Division Synchronous Code Division Multiple Access (TD-SCDMA). Some subframes are explicitly designated for either downlink (DL) or uplink (UL) transmission. In particular, subframes 0 and 5 are always reserved for downlink transmission because those two subframes need to carry the synchronization signal for cell identification. Subframes immediately following the special subframes are always reserved for uplink transmissions. Other subframes can be configured for either DL or UL transmission.

The UL and DL traffic of the LTE UE is controlled by the eNB. A UE receives UL scheduling information from its serving eNB. The UE decodes UL scheduling information. If the UE is scheduled to transmit, it will transmit several subframes later depending on the TDD DL/UL configuration. There is less than 3 ms time duration for the UE to prepare its UL data.

More details can be found in TS36.211 on physical channels and modulations and TS36.213 on physical layer procedures.

Figure 7:
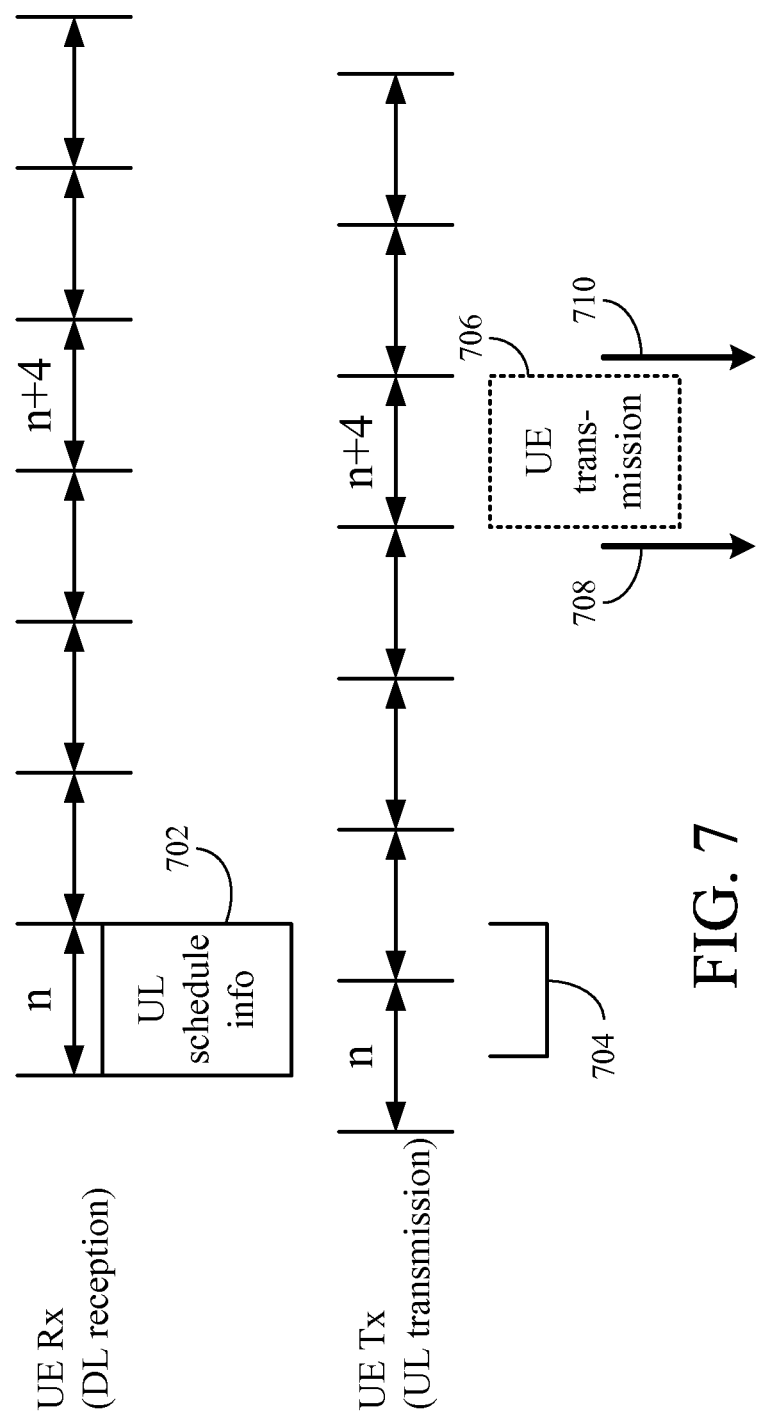
FIG. 7 is an example timing diagram.

FIG. 7 is an example timing diagram. Several subframes of an LTE TDD frame are shown. During one of the UE downlink (DL) reception subframes, indexed "n", the second communication module 111 receives uplink scheduling information 702 from base station 124. Decoding of the uplink scheduling information may occur slightly afterwards, during a time referenced 704. If the second communication module 111 is scheduled to transmit, any such transmission will occur 4 subframes later, during the UE uplink (UL) transmission subframe indexed "n+4". For the DL and UL subframes with the same subframe index, the UE UL subframe may be ahead of UE DL subframe, indicating a time advance in UE UL transmission to overcome a round trip over-the-air (OTA) propagation delay. The round trip OTA delay is equal to the sum of one-way OTA propagation delay in the downlink from the eNB to the UE and one-way OTA propagation delay in the uplink from the UE to the eNB. The UE UL transmission timing shown in FIG. 7 indicates a time advance. A possible transmission 706 from the second communication module 111, for example, an uplink shared channel signal, is illustrated as occurring during the subframe indexed "n+4". However, if the uplink scheduling information does not schedule the second communication module 111 to transmit, then no such transmission will occur.

The first communication module 101, having been notified over the bus 136 by the second communication module 111 of the timing of the LTE UE UL subframes and having been notified over the bus 136 by the second communication module 111 that the uplink scheduling information schedules the second communication module 111 to transmit, may calculate a dynamic rate threshold as described above with respect to FIG. 6, based on a predicted SINR during the possible transmission 706. Here, the timing of the LTE UE UL subframes may be advanced with respect to the UE DL subframes to overcome the round-trip OTA delay between the eNB and the UE and it may change over time. Because of that, the timing of the LTE UE UL subframes needs to be passed to the first communication module 101. The predicted SINR is calculated based on Equation 3, where TX_Interference(t) calculated based on Equation 5 is an anticipated Tx interference expected at the first communication module 101 due to the anticipated transmission from the second communication module 111. If the change (expected to be a decrease) in the dynamic rate threshold results in a change in the number of data rates that do not exceed the dynamic rate threshold, the first communication module 101 may advertise an updated advertisement of support 708 in the wireless network 134 just prior to the subframe where the possible transmission 706 is expected to begin (that is, just prior to the start of the subframe indexed "n+4"). Advertising the updated advertisement of support may involve beacon frames. Disassociation of any associated client devices, as described above with respect to FIG. 6, may be triggered by the first communication module 101 just prior to the subframe where the possible transmission 706 is expected to begin (that is, just prior to the start of the UE Tx subframe indexed "n+4"), in which case the advertising may involve responses to association requests and/or to reassociation requests. After the possible transmission 706 is expected to finish (that is, just after the end of the subframe indexed "n+4"), the first communication module 101 may again calculate a dynamic rate threshold as described above with respect to FIG. 6, based on a newly predicted SINR. The newly predicted SINR may be calculated based on Equation 3, where TX_Interference(t) is calculated based on Equation 5 but with a much smaller value for $P_{TX}(f, t)$ to reflect an anticipated transmission-off scenario from the second communication module 111. Alternatively, the newly predicted SINR may be calculated based on Equation 3 but with the component TX_Interference(t) completed removed from the SINR calculation. If the change (expected to be an increase) in the dynamic rate threshold results in a change in the number of data rates that do not exceed the dynamic rate threshold, the first communication module 101 may advertise an updated advertisement of support 710 in the wireless network 134.

Similarly, the timing of a scheduled PUSCH transmission in LTE (whether TDD mode or frequency-division duplex (FDD) mode) are accessible by the LTE UE approximately 2 subframes (2 ms) in advance of the scheduled PUSCH transmission. The first communication module 101, having been notified over the bus 136 by the second communication module 111 of the timing of the scheduled PUSCH transmission, may calculate a dynamic rate threshold as described above with respected to FIG. 6, based on a predicted SINR during a scheduled PUSCH transmission. If the change (expected to be a decrease) in the dynamic rate threshold results in a change in the number of data rates that do not exceed the rate threshold, the first communication module 101 may advertise an updated advertisement of support in the wireless network 134 just prior to the scheduled PUSCH transmission. Advertising the updated advertisement of support may involve beacon frames. Disassociation of any associated client devices, as described above with respect to FIG. 6, may be triggered by the first communication module 101 just prior to the scheduled PUSCH transmission, in which case the advertising may involve responses to association requests and/or to reassociation requests. After the scheduled PUSCH transmission, the first communication module 101 may again calculate a dynamic rate threshold as described above with respect to FIG. 6, based on a newly predicted SINR. If the change (expected to be an increase) in the dynamic rate threshold results in a change in the number of data rates that do not exceed the dynamic rate threshold, the first communication module 101 may advertise an updated advertisement of support in the wireless network 134.

Apparatus Details

Figure 8:
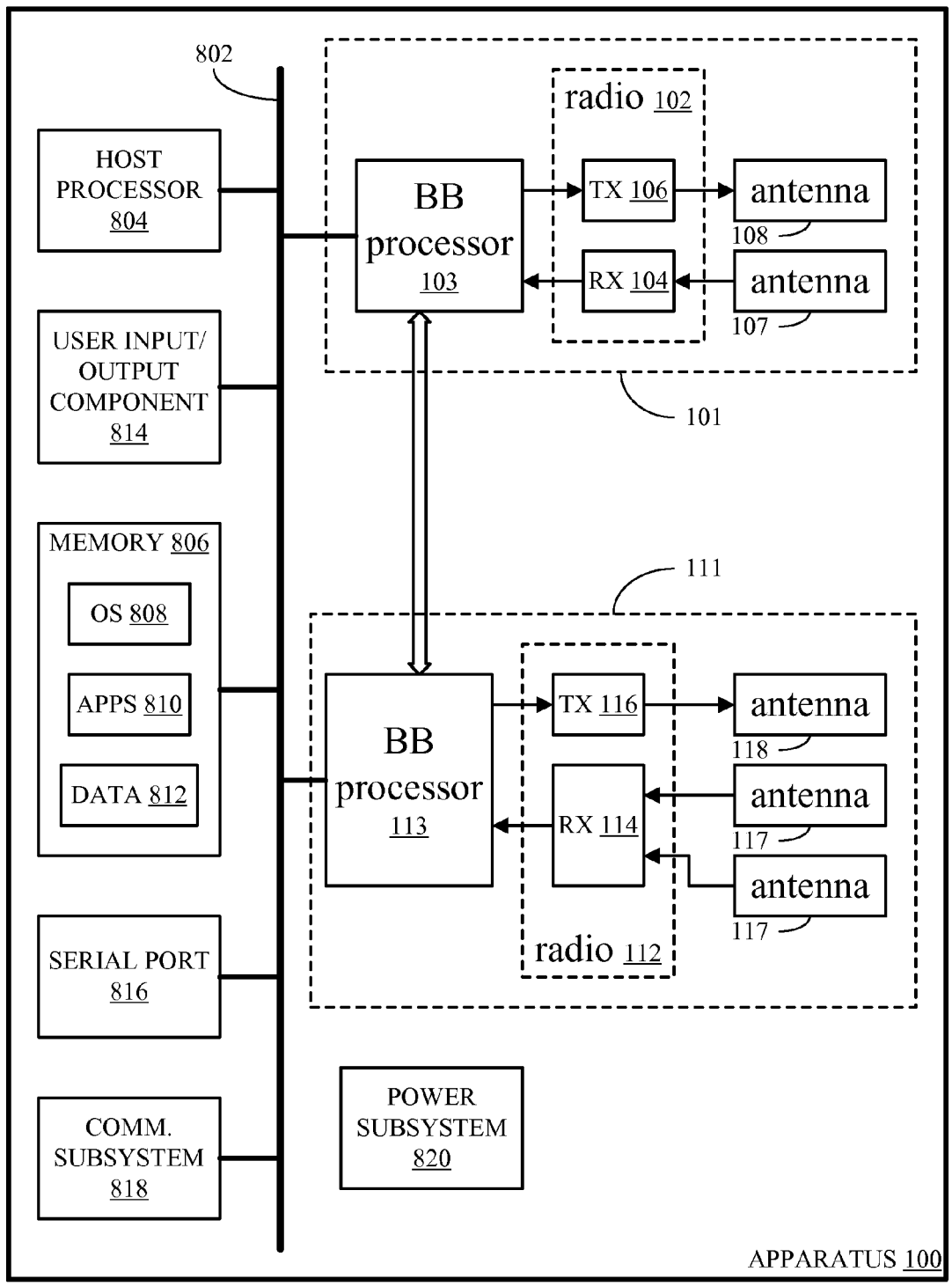
FIG. 8 is an example functional block diagram of an example apparatus.

FIG. 8 is an example functional block diagram of an example apparatus, for example apparatus 100. Those features of apparatus 100 illustrated in FIG. 1 are illustrated also in FIG. 8. The apparatus 100 has an internal bus 802 to which the first baseband processor 103 and the second baseband processor 113 are coupled. The apparatus 100 comprises one or more host processors 804 coupled to the internal bus 802 and a memory 806 coupled to the internal bus 802. The memory 806 stores an operating system 808, various applications 810, and data 812 for use by the operating system 808 or by the various applications 810 or by both. A non-exhaustive list of examples for applications 810 includes a calendar application, a task application, an address book application, an instant messaging application, a browser application, and the like. In the case where the applications 810 include a telephony application, the apparatus 100 comprises smartphone functionality.

One or more user input/output components 814 are coupled to the internal bus 802. A non-exhaustive list of examples for user input/output components 814 includes a display screen, a touch screen, an optical pad, a keyboard, a keypad, pressable buttons, a trackball, a trackpad, a thumbwheel, a microphone, a speaker, and the like. Configuration of the apparatus 100 may involve the one or more user input/output components 814.

The apparatus 100 may optionally comprise one or more serial ports 816 (for example, universal serial bus (USB) or micro-USB ports) coupled to the internal bus 802.

The apparatus 100 may optionally comprise one or more communication subsystems 818 coupled to the internal bus 802. A non-exhaustive list of examples for communication subsystems 818 includes a wired communication module, a wireless personal area network communication module, a near field communications (NFC) module, a global positioning system (GPS) subsystem, and the like.

The apparatus 100 comprises a power subsystem 820 that supplies power to the various electronic components in the apparatus 100. The power subsystem 820 may be any form of power supply, such as a conventional rechargeable battery (removable or non-removable), a fuel cell system, a solar cell, or the like, or any combination thereof. The apparatus 100 in some implementations may be electrically connectable to a fixed power supply such as a wall outlet. However, in those cases where the power subsystem 820 supports the portability of the apparatus 100, the apparatus effectively comprises a mobile wireless communication device.

The apparatus 100 may comprise other components that are not illustrated in FIG. 8 so as not to obscure the description of the technology of interest.

Thus far, the teachings of this paper apply to an apparatus that comprises both a first communication module and a second communication module, where the first communication module is operable as a wireless access point and refrains from advertising support for any data rate that is not expected to be sufficiently resilient in the face of interference caused by transmissions from the second communication module. In other words, the first communication module and the second communication module are "co-located", because they are contained within the housing of the apparatus and are always in the same location.

Consider instead a wireless access point that comprises a communication module such as the first communication module 101, and that is in the presence of a user equipment that comprises a communication module such as the second communication module 111. There is the potential for transmissions from the user equipment to contribute to interference at the wireless access point. The teachings of this paper could be modified to apply to such a wireless access point, even though it is not "co-located" with the user equipment, so that the wireless access point refrains from advertising support for any data rate that is not expected to be sufficiently resilient in the face of interference caused by transmissions from the user equipment. As described in detail above, the wireless access point could advertise support for a single data rate and refrain from advertising support for any other data rate. Alternatively, the wireless access point could refrain from advertising support for any data rate that exceeds a fixed rate threshold, and could advertise support for one or more supported data rates each of which does not exceed the fixed rate threshold. As a further alternative, the wireless access point could refrain from advertising support for any data rate that exceeds a dynamic rate threshold, and could advertise support for one or more supported data rates each of which does not exceed the dynamic rate threshold.

What is claimed is:

1. An apparatus comprising:
a first communication module comprising a first radio coupled to a first baseband processor, the first communication module compatible with a first wireless communication technology, the first communication module operable to refrain from advertising support for any data rate that exceeds a fixed rate threshold and operable to advertise support for one or more supported data rates each of which does not exceed the fixed rate threshold; and
a second communication module comprising a second radio coupled to a second baseband processor, the second communication module compatible with a second wireless communication technology that differs from the first wireless communication technology,
the fixed rate threshold defined as the rate at which data would be receivable at a predetermined quality by the first communication module if the first communication module were to receive the data in a signal to which a specific signal-to-interference-plus-noise ratio (SINR) is applicable, where the specific SINR takes into account a contribution of transmissions by the second communication module to interference at the first communication module,
wherein the fixed rate threshold is determined only once per channel for the apparatus.

2. The apparatus as recited in claim 1, the first communication module operable as a router/gateway to provide one or more client devices compatible with the first wireless communication technology with access to a destination network via the second communication module.

3. The apparatus as recited in claim 2, wherein the destination network comprises the Internet.

4. The apparatus as recited in claim 1, wherein the first communication module is operable as a client device compatible with the first wireless communication technology.

5. The apparatus as recited in claim 1, wherein the specific SINR is based on a maximum transmit power configured in a transmitter of the second communication module.

6. The apparatus as recited in claim 1, wherein the first wireless communication technology is a wireless local area network technology.

7. The apparatus as recited in claim 6, wherein the first wireless communication module is operable in the unlicensed industrial, scientific and medical 2.4 GHz frequency band.

8. The apparatus as recited in claim 1, wherein the second wireless communication technology is based on Long Term Evolution (LTE).

9. The apparatus as recited in claim 1, wherein the second wireless communication technology is based on Worldwide Interoperability for Microwave Access (WiMAX).

10. The apparatus as recited in claim 1, wherein the apparatus comprises a mobile wireless communications device.

11. The apparatus as recited in claim 10, wherein the apparatus has smartphone functionality.

12. A method comprising:
refraining from advertising support for any data rate that exceeds a fixed rate threshold; and
advertising support for one or more supported data rates each of which does not exceed the fixed rate threshold, the one or more supported data rates belonging to a set of data rates permitted in a first wireless communication technology,
the fixed rate threshold defined as the rate at which data would be receivable at a predetermined quality by a first communication module of an apparatus if the first communication module were to receive the data in a signal to which a specific signal-to-interference-plus-noise ratio (SINR) is applicable, where the specific SINR takes into account a contribution of transmissions by a second communication module of the apparatus to interference at the first communication module, the first communication module compatible with the first wireless communication technology, and the second communication module compatible with a second wireless communication technology that differs from the first wireless communication technology,
wherein the fixed rate threshold is determined only once per channel.

13. The method as recited in claim 12, further comprising:
   providing one or more client devices compatible with the first wireless communication technology with access to a destination network via the second communication module.

14. The method as recited in claim 13, wherein the destination network comprises the Internet.

15. The method as recited in claim 12, wherein the specific SINR is based on a maximum transmit power configured in a transmitter of the second communication module.

* * * * *

UNITED STATES PATENT AND TRADEMARK OFFICE
CERTIFICATE OF CORRECTION

PATENT NO. : 9,307,414 B2  
APPLICATION NO. : 13/462863  
DATED : April 5, 2016  
INVENTOR(S) : Mohammed Nawaf Smadi et al.

It is certified that error appears in the above-identified patent and that said Letters Patent is hereby corrected as shown below:

In the specification,

The equation at column 15, line 25 should read $$\text{NoiseRef}_{RF}(f_{BB}, t) = \text{NoiseRef}_{BB}(f_{BB}, t) - \text{RX\_Gain}_{NoTX\_Interference}(t)$$

Signed and Sealed this  
Seventh Day of June, 2016

Michelle K. Lee  
*Director of the United States Patent and Trademark Office*